(No Model.)  2 Sheets—Sheet 1.

G. H. PRESTON.
DEVICE FOR CHANGING SPEED.

No. 300,734.  Patented June 17, 1884.

Witnesses:
A. C. Turner
M. V. Smith

Inventor:
Geo. H. Preston
By his atty.
R. D. O. Smith (No Model.) 2 Sheets—Sheet 2.

G. H. PRESTON.
DEVICE FOR CHANGING SPEED.

No. 300,734. Patented June 17, 1884.

WITNESSES: INVENTOR:

UNITED STATES PATENT OFFICE.

GEORGE H. PRESTON, OF SHORTSVILLE, NEW YORK, ASSIGNOR OF ONE-HALF TO THE EMPIRE DRILL COMPANY, OF SAME PLACE.

DEVICE FOR CHANGING SPEED.

SPECIFICATION forming part of Letters Patent No. 300,734, dated June 17, 1884.

Application filed November 23, 1883. (No model.)

*To all whom it may concern:*

Be it known that I, GEORGE H. PRESTON, of Shortsville, in the county of Ontario and State of New York, have invented a new and useful Improvement in Devices for Regulating and Varying the Relative Speed of Driving and Counter Shafts, &c.; and I do hereby declare that the following is a full and accurate description of the same.

It is generally necessary, or at least highly desirable, to maintain a uniform speed of the driving-shaft; and it is also frequently necessary to actuate a machine driven by said shaft with a variable speed. This is accomplished with a variety of devices, such as cone-pulleys, change-gears, &c.—well-known mechanical expedients for the purpose of changing speed. There are also some devices which admit of the desired change while the machine is in motion. This device I have employed to drive the feed-shaft of a seeding-machine, it being highly desirable in machines of that class that the attendant shall be able to change the speed of the seed-wheels without the removal of interchangeable parts and at will.

Figure 1:
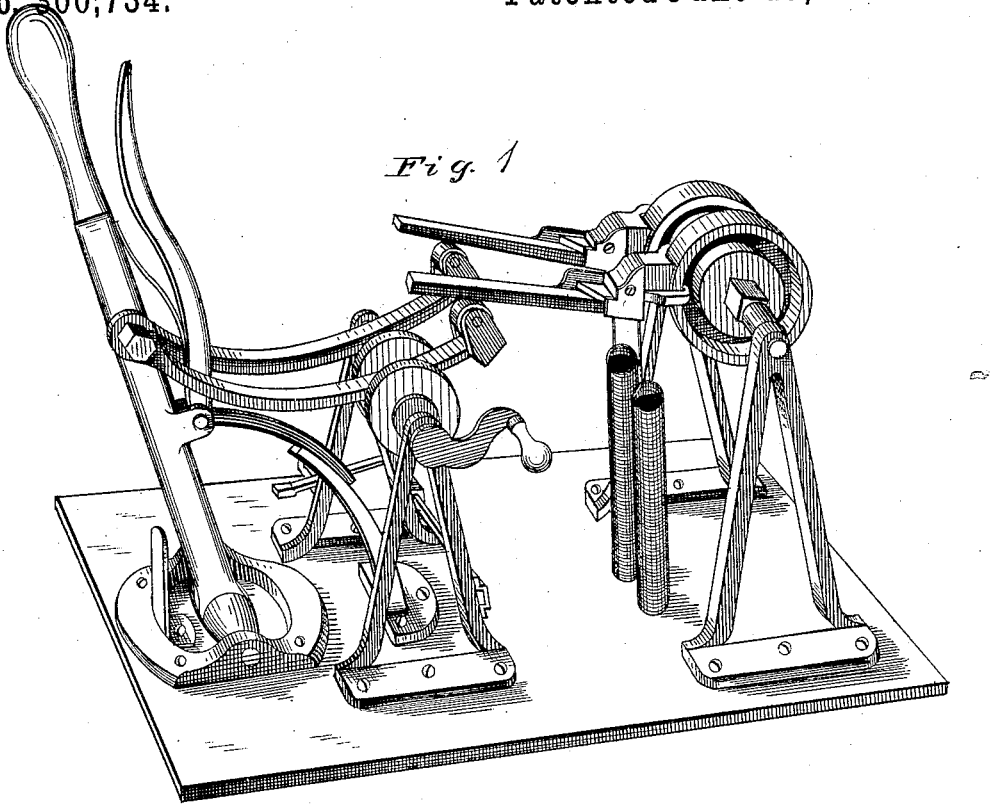
Figure 2:
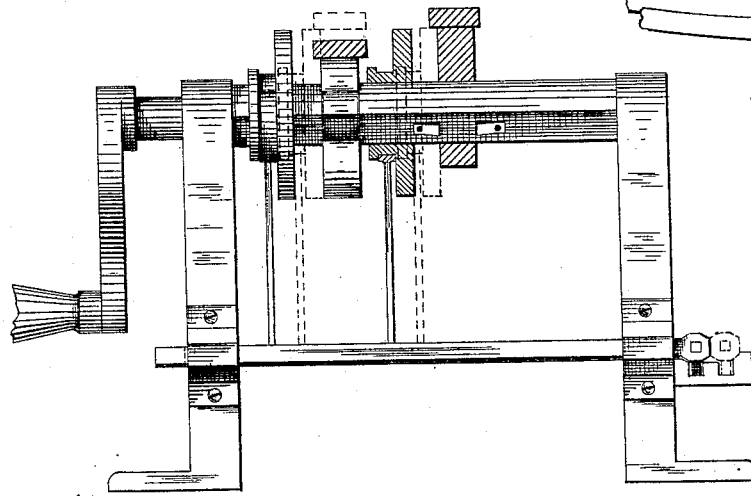
Figure 3:
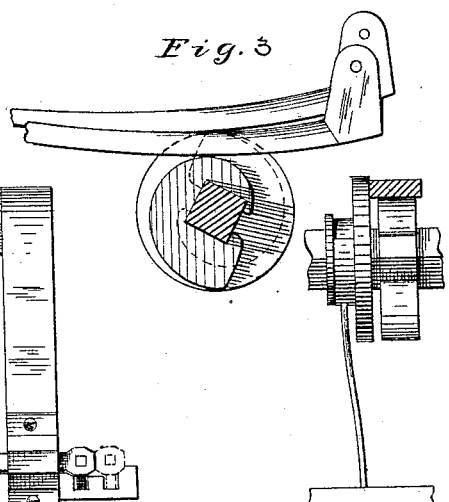
Figure 4:
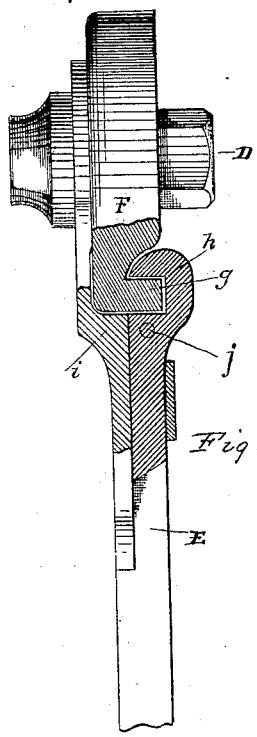
Figure 5:
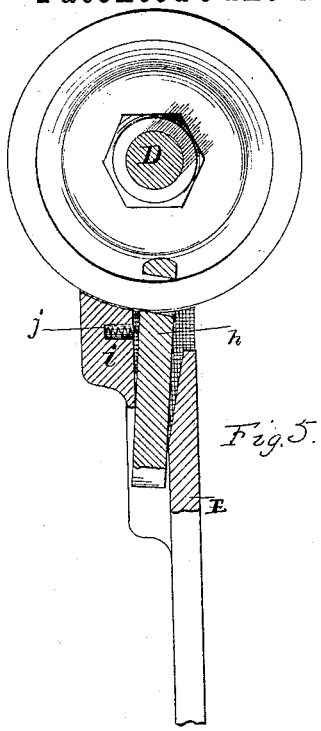
Figure 6:
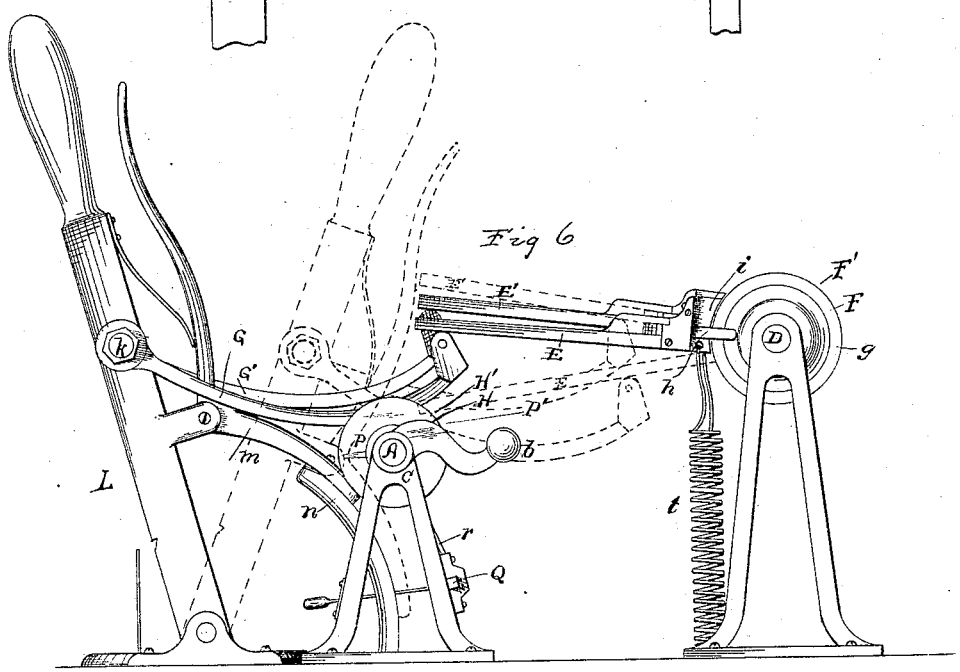

Referring to the drawings, Figure 1 is a perspective of my invention. Fig. 2 is a transverse section of the same on line $x\,x$. Fig. 3 represents details. Figs. 4 and 5 represent details of the clutch. Fig. 6 is a side elevation.

A is the driving-shaft, to which power and motion may be transmitted from the prime mover by any proper means. In the drawings the means for transmitting power and motion is represented by the crank $b$. The shaft A is mounted and turns in suitable bearing-boxes, C.

D is the counter-shaft whereby motion is communicated directly to the mechanism which it is proposed to actuate. That mechanism is not shown in the drawings; but it will be understood that said mechanism derives its motion from the shaft D and moves at a uniform speed with it.

Upon the shaft D, I mount two or more levers, E E', as upon an axis, and also a corresponding number of disk-wheels, F F', and I provide means for automatically engaging each lever with its corresponding disk when said lever is moved in one direction, and disengaging the same when moved in the opposite direction. Means for accomplishing this end are well known, and for certain purposes there may be a preference as to the means to be employed; but I prefer a proper friction-clutch—such as shown—because it is silent and prompt in action and does not involve appreciable lost motion. For convenience of description only one set of levers, &c., will be referred to. I therefore construct such wheel F with a laterally-projecting peripheral flange, $g$, over and around the edge of which a hook, $h$, extends, said hook being slightly larger than the edge of the flange, so that the latter may move freely through said hook when the same is in favorable position, but be clamped between the opposite edges of the hook when in working position. The hook $h$ is laid loosely upon the lever E, but kept in proper place by a cover-plate, $i$, or other suitable means, and a spring, $j$, bears against said hook to keep it always in working position, so that when the lever E is raised up the hook bites the flanges and causes the wheel F and shaft D to turn, and when said lever descends the spring $j$ yields slightly and permits the hook to slide on the flange. A weight may sometimes be substituted for the spring $j$; but for general purposes the spring is to be preferred, because of compactness and promptness of action. Another lever, G, is provided, having a movable fulcrum at $k$, and resting upon a cam, H, on the shaft A. The free end of the lever G engages with the under side of the lever E, and as the shaft A turns said free end and the lever E are caused to rise and fall, and the shaft D is thereby caused to revolve. The fulcrum $k$ is made movable, so that it may be caused to approach or recede from the shaft A, and thereby vary the relative lengths of the parts of the lever at each side of the shaft A, and thereby vary the throw or arc described by the free end of the lever G, and this also effects a similar change in the lever E by bringing the point of engagement with said lever G nearer to or farther from the shaft D, so that it happens when the fulcrum $k$ is moved the moving force is applied to both levers, either nearer to or farther from their fulcrum centers, and their motions correspondingly increased or diminished.

To make the fulcrum $k$ readily movable and at all times under control of the attendant, I attach it to a hand-lever, L, pivoted to the main frame, and provided with a hand-latch, $m$, working on a segment, $n$, to hold the lever L in any desired position. A stop is provided to arrest the lever L and prevent it from being drawn too far backward.

The wheel F' and levers E' and G' are duplicates of the corresponding parts, F E G. The cam H' is also a duplicate of cam H, but is set differently upon the shaft A, so as to alternate the motions of the levers. The cams H H' are true spirals, so that the speed of the shaft A being uniform, the speed of the shaft D will be uniform also, and the cams being set so as to alternate the motion, the motion of shaft D is made continuous and uniform. By the side of each cam there is a disk-wheel, P P', the radius whereof is equal to the greatest eccentricity of the cam, and both cam and disk are made movable upon the shaft A, so that the disk-wheels may be brought under the levers G G', respectively, to hold them up away from the cams when it is desired to arrest the motion of shaft D without stopping shaft A. For this purpose the cams and their disk-wheels are controlled by the shifting-bar Q and its elastic forked arms $r$, which permit the shifting-bar to be moved in advance of the movement of the cams, because the cam can only move aside at that point of its revolution when it has raised the lever E as high as the edge of the disk-wheel. At that moment the elastic action of the arm $r$ will cause the disk-wheel to slide under the lever. As the cams do not reach this point at the same moment, they will be separately and successively moved.

In situations where gravity will not act in the necessary direction, or when the parts are not sufficiently heavy, springs similar to the springs $t$ may be employed to pull the levers E down after each elevation by the cams.

It will appear evident from the description above that the two sets of levers shown will impart to the shaft D a continuous and uniform motion; but the employment of a larger number of levers and cams will accomplish that end with less variability of resistance on the shaft A, because the cams may then be made with shorter throw and a corresponding reduction of leverage. It may therefore be advantageous for some purposes to employ a larger number than two.

Having described my invention, what I claim as new is—

1. The shaft D, the lever E, mounted thereon as an axis, and the wheel F, provided with means whereby said lever will engage with said wheel when moved in one direction, and disengage the same when moved in the opposite direction, combined with a device whereby power may be applied to said lever at a variable distance from the axis of shaft D.

2. The shaft D, the wheel F, fixed thereon, and the vibrating lever E, pivoted on said shaft, and provided with means whereby said lever will engage or disengage said wheel, according to the direction of its motion, combined with the lever G, pivoted at one end to a movable fulcrum, and a cam, H, upon the motor-shaft A, whereby power may be applied to said lever E at variable determinate distances from the axis of shaft D.

3. The shaft D and laterally-flanged wheel F, fixed thereon, combined with the lever E, pivoted to said shaft, and the clamping-hook $h$, carried loosely upon said lever, and kept in engagement with said flange by spring $j$, for the purpose set forth.

4. The shaft D, wheel F, fixed thereon, and the vibrating lever E, provided with the clamping-hook $h$, to engage the rim of said wheel, combined with the lever G and pivoted lever L, to which said lever is jointed at $k$, and made movable toward or away from the shaft D, and the cam H on shaft A, as and for the purpose set forth.

5. The shaft D, with the wheels F F', fixed thereon, the levers E E', pivoted on said shaft, and each provided with means for engaging and disengaging its wheel, as described, combined with the corresponding levers G G', pivoted to a movable fulcrum, $k$, and the cams H H', set upon the shaft A so as to alternate the motions of the levers, and thereby render the motion of the shaft D continuous.

6. The shaft D, with the wheels F F', fixed thereon, the levers E E', pivoted on said shaft, and provided with means for engaging and disengaging the wheels F F', as set forth, the corresponding levers G G', pivoted to the fulcrum $k$, combined with cams H H', the faces whereof are true spiral planes, and set upon the shaft A so as to alternate, whereby the speed of the shaft D will be rendered continuous and uniform.

7. The shaft D, wheel F, lever E, with its device for engaging and disengaging said wheel, and the lever G, pivoted at $k$, combined with the cam H and its disk-wheel P, both laterally movable upon the shaft A, whereby the lever G may be transferred to said disk-wheel and the motion of said lever arrested without stopping the driving-shaft A.

8. The lever G, pivoted at $k$, cam H, and disk-wheel P, laterally movable upon the shaft A, combined with the shifting-bar Q and its elastic fork-arms $r$, as and for the purpose set forth.

GEORGE H. PRESTON.

Witnesses:
OLIVER S. TITUS,
HENRY O. KLINCK.